(12) United States Patent
Furukawa

(10) Patent No.: US 12,308,775 B2
(45) Date of Patent: May 20, 2025

(54) MOTOR DRIVE DEVICE

(71) Applicant: Panasonic Intellectual Property Management Co., Ltd., Osaka (JP)

(72) Inventor: Satoshi Furukawa, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 18/043,774

(22) PCT Filed: Jul. 30, 2021

(86) PCT No.: PCT/JP2021/028260
§ 371 (c)(1),
(2) Date: Mar. 2, 2023

(87) PCT Pub. No.: WO2022/064840
PCT Pub. Date: Mar. 31, 2022

(65) Prior Publication Data
US 2023/0336103 A1    Oct. 19, 2023

(30) Foreign Application Priority Data
Sep. 23, 2020  (JP) ................................ 2020-159133

(51) Int. Cl.
*H02P 27/06* (2006.01)
*H02P 21/22* (2016.01)

(52) U.S. Cl.
CPC .............. *H02P 27/06* (2013.01); *H02P 21/22* (2016.02)

(58) Field of Classification Search
CPC ................................ H02P 27/06; H02P 21/22
See application file for complete search history.

(56) References Cited

U.S. PATENT DOCUMENTS

2015/0365020 A1* 12/2015 Ogino ..................... H02M 1/36
318/400.21
2023/0261601 A1*  8/2023 Kawashima .......... H02M 1/126
363/40

FOREIGN PATENT DOCUMENTS

| CN | 1455263 A | 11/2003 |
| EP | 3502723 A1 | 6/2019 |
| JP | 3-207274 A | 9/1991 |
| JP | 08-223930 | 8/1996 |
| JP | 09-284985 | 10/1997 |

(Continued)

OTHER PUBLICATIONS

International Search Report of PCT application No. PCT/JP2021/028260 dated Sep. 28, 2021.

(Continued)

*Primary Examiner* — Said Bouziane
(74) *Attorney, Agent, or Firm* — Rimon P.C.

(57) ABSTRACT

There is provided a motor drive device that drives a motor using a three-phase alternating current as a power source. The motor drive device includes a rectifier circuit that rectifies the three-phase alternating current, a current detection circuit that detects a current of a direct current rectified by the rectifier current, and a cross point detection circuit that detects a cross point between the current detected by the current detection circuit and a predetermined current value, and outputs a control signal indicating whether or not to drive the motor based on a detection result.

4 Claims, 8 Drawing Sheets

(56) References Cited

FOREIGN PATENT DOCUMENTS

| | | |
|---|---|---|
| JP | 2000-116186 | 4/2000 |
| JP | 2006-296168 A | 10/2006 |

OTHER PUBLICATIONS

The EPC Office Action dated Jan. 31, 2024 for the related European Patent Application No. 21871972.2.

* cited by examiner

MOTOR DRIVE DEVICE

CROSS-REFERENCE TO RELATED APPLICATIONS

This application is a U.S. national stage application of the PCT International Application No. PCT/JP2021/028260 filed on Jul. 30, 2021, which claims the benefit of foreign priority of Japanese patent application No. 2020-159133 filed on Sep. 23, 2020, the contents all of which are incorporated herein by reference.

TECHNICAL FIELD

The present disclosure relates to a motor drive device that drives a motor.

BACKGROUND ART

In the related art, a motor drive device using a three-phase alternating current as a power source has been known (see, for example, PTL 1).

In a case where there is a phase loss in the three-phase alternating current serving as the power source, when a load of the motor to be driven is relatively large, the motor drive device may not be able to normally drive the motor.

Thus, when there is a possibility that the motor cannot be normally driven due to a phase loss in the three-phase alternating current serving as the power source, it is desirable not to drive the motor.

CITATION LIST

Patent Literature

1: Unexamined Japanese Patent Publication No. 2000-116186

SUMMARY OF THE INVENTION

Therefore, an object of the present disclosure is to provide a motor drive device capable of outputting a control signal not to drive a motor in a case where there is a possibility that the motor cannot be normally driven due to a phase loss in a three-phase alternating current serving as a power source.

A motor drive device according to one aspect of the present disclosure is a motor drive device that drives a motor using a three-phase alternating current as a power source. The motor drive device includes a rectifier circuit that rectifies the three-phase alternating current to generate a direct current, a current detection circuit that detects the direct current rectified by the rectifier current, and a cross point detection circuit that detects a cross point between the direct current detected by the current detection circuit and a predetermined current value, and outputs a control signal indicating whether or not to drive the motor based on a result of the detection.

As a result, in a case where there is a possibility that the motor cannot be normally driven due to a phase loss in the three-phase alternating current serving as the power source, the motor drive device capable of outputting the control signal not to drive the motor is provided.

DESCRIPTION OF EMBODIMENT

Hereinafter, a specific example of a motor control device according to an aspect of the present disclosure will be described with reference to the drawings. Note that exemplary embodiments to be described below each illustrate a specific example of the present disclosure. Numerical values, shapes, constituent components, arrangement positions and connection modes of the constituent components, steps, order of the steps, and the like illustrated in the following exemplary embodiments are merely examples, and therefore are not intended to limit the present disclosure. Further, each of the drawings is a schematic view, and is not necessarily precisely illustrated.

Note that the comprehensive or specific aspects of the present disclosure may be implemented by a system, a method, an integrated circuit, a computer program, or a computer-readable recording medium such as a compact disk read only memory (CD-ROM), or may be implemented by any combination of a system, a method, an integrated circuit, a computer program, and a recording medium.

First Exemplary Embodiment

Figure 1:
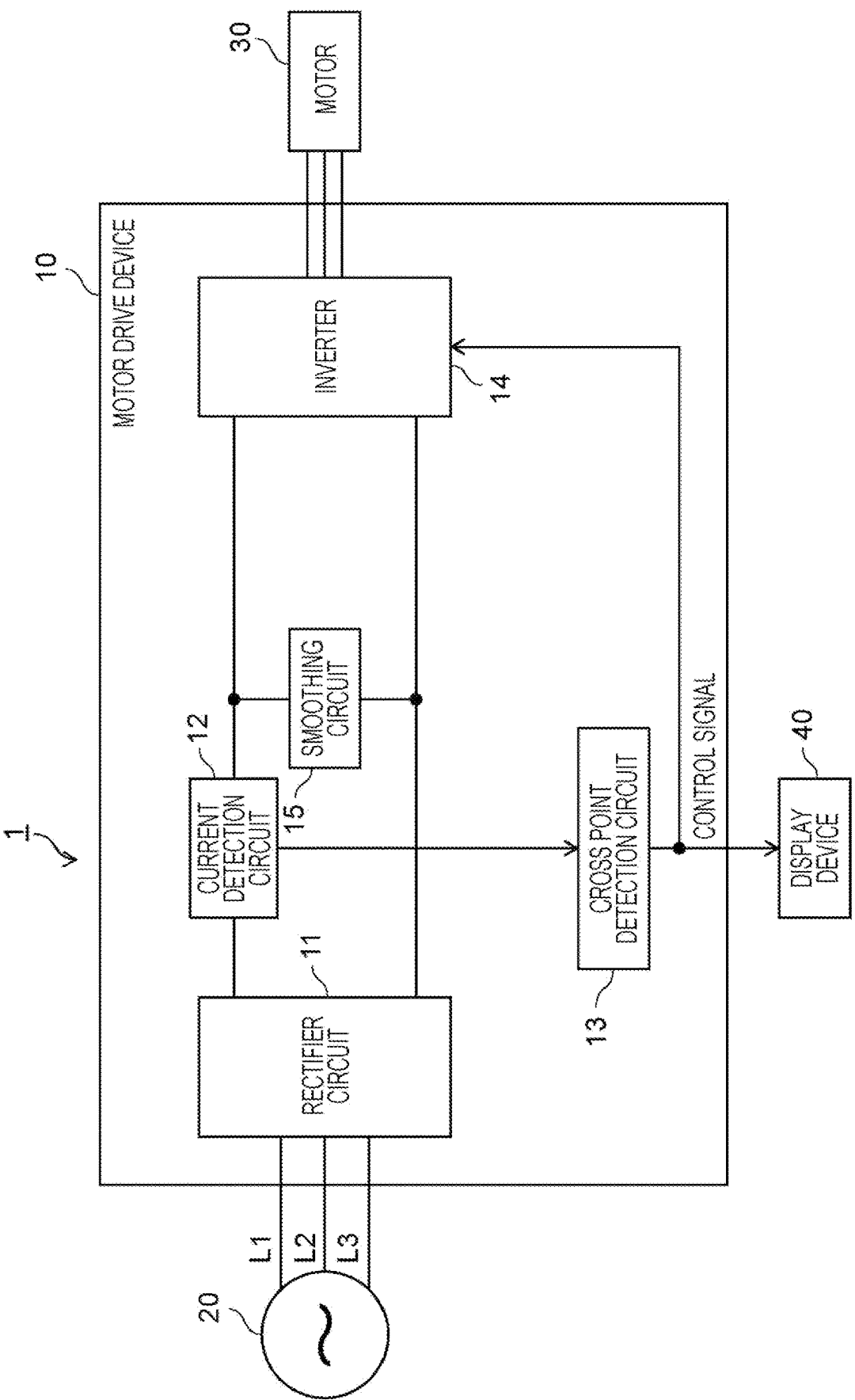
FIG. 1 is a block diagram illustrating a configuration of a motor drive system according to a first exemplary embodiment.

FIG. 1 is a block diagram illustrating a configuration of motor drive system 1 according to a first exemplary embodiment.

As illustrated in FIG. 1, motor drive system 1 includes motor drive device 10, three-phase alternating current power supply 20, motor 30, and display device 40.

Motor 30 is driven by motor drive device 10.

three-phase alternating current power supply 20 supplies a three-phase alternating current including three phases of an L1 phase, an L2 phase, and an L3 phase to motor drive device 10.

Display device 40 displays an image based on a control signal (to be described later) output from motor drive device 10.

Motor drive device 10 uses, as a power source, the three-phase alternating current supplied from three-phase alternating current power supply 20 to drive motor 30.

As illustrated in FIG. 1, motor drive device 10 includes rectifier circuit 11, current detection circuit 12, cross point detection circuit 13, inverter 14, and smoothing circuit 15.

Rectifier circuit 11 rectifies the three-phase alternating current supplied from three-phase alternating current power supply 20. Hereinafter, a direct current rectified by rectifier circuit 11 and not smoothed by smoothing circuit 15 to be described below is also referred to as an "unsmoothed direct current".

The unsmoothed direct current rectified by rectifier circuit 11 is supplied to smoothing circuit 15, and the supplied unsmoothed direct current is smoothed. Hereinafter, the direct current smoothed by smoothing circuit 15 is also referred to as a "smoothed direct current".

The smoothed direct current smoothed by smoothing circuit 15 is supplied to inverter 14 to drive motor 30. More specifically, inverter 14 converts the supplied smoothed direct current into a three-phase alternating current, and supplies the converted three-phase alternating current to motor 30 to drive motor 30.

When a load of motor 30 increases, a power of the three-phase alternating current supplied from inverter 14 to motor 30 increases. Thus, a voltage drop of the smoothed direct current supplied to inverter 14 increases.

In a case where the smoothed direct current is converted into the three-phase alternating current, when a control signal (to be described later) indicating that the motor 30 is not to be driven is input from cross point detection circuit 13, inverter 14 stops the conversion into the three-phase alternating current.

In a case where the conversion into the three-phase alternating current is stopped, when a control signal (to be described later) indicating that the motor 30 is to be driven is input from cross point detection circuit 13, inverter 14 starts the conversion into the three-phase alternating current.

Figure 2A:
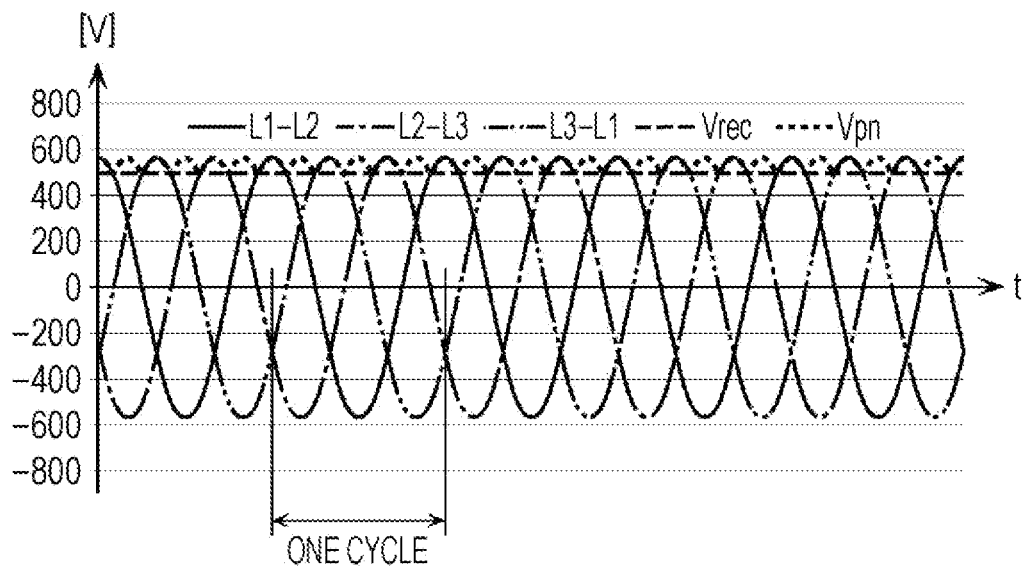
FIG. 2A is a waveform diagram illustrating a voltage waveform in a low load state in a case where there is no phase loss in a three-phase alternating current.
Figure 2B:
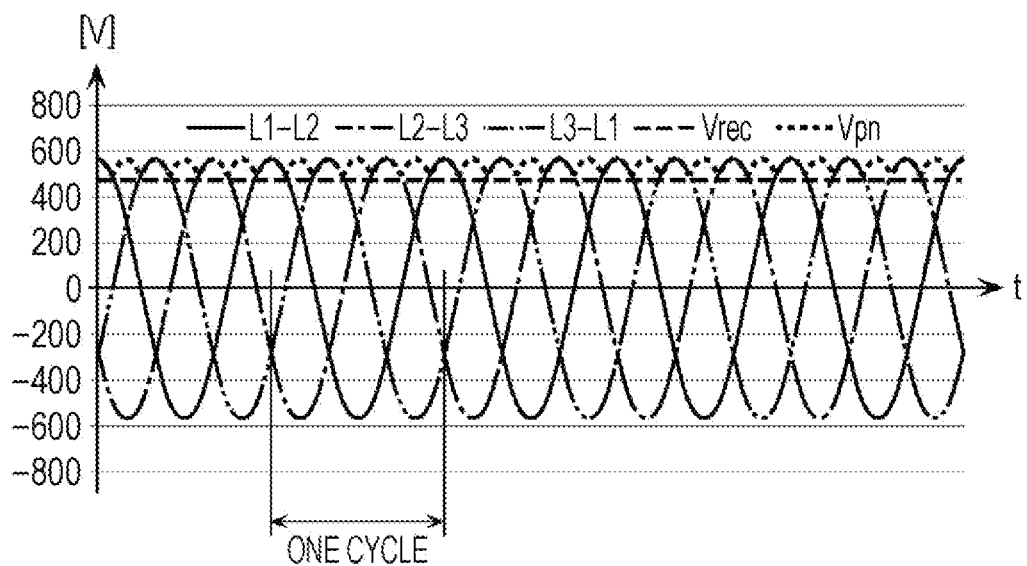
FIG. 2B is a waveform diagram illustrating a voltage waveform in a high load state in a case where there is no phase loss in the three-phase alternating current.

FIG. 2A is a waveform diagram illustrating a voltage waveform in a low load state in a case where there is no phase loss in the three-phase alternating current. FIG. 2B is a waveform diagram illustrating a voltage waveform in a high load state in a case where there is no phase loss in the three-phase alternating current.

FIG. 2A is a waveform diagram in a state (hereinafter, also referred to as a "low load state") where a relatively small load with which a voltage drop does not occur is applied to motor 30 only until a voltage of the smoothed direct current is greater than or equal to a minimum voltage of the unsmoothed direct current in a case where there is no phase loss in the three-phase alternating current input to rectifier circuit 11. FIG. 2B is a waveform diagram in a state (hereinafter, also referred to as a "high load state") where a relatively large load with which a voltage drop occurs is applied to motor 30 until the voltage of the smoothed direct current is less than the minimum voltage of the unsmoothed direct current in a case where there is no phase loss in the three-phase alternating current input to rectifier circuit 11.

Figure 2C:
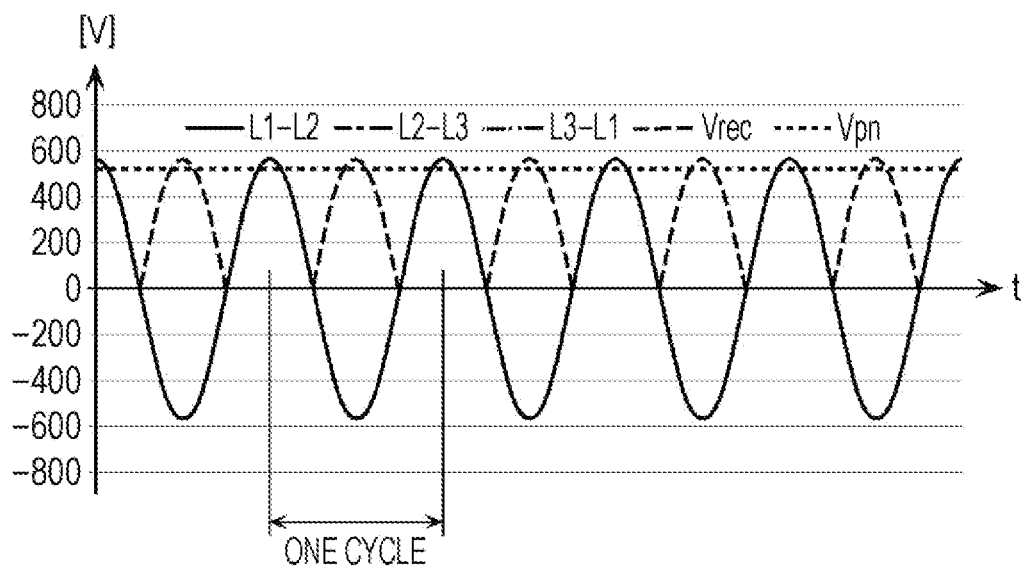
FIG. 2C is a waveform diagram illustrating a voltage waveform in a low load state in a case where there is a phase loss in the three-phase alternating current.
Figure 2D:
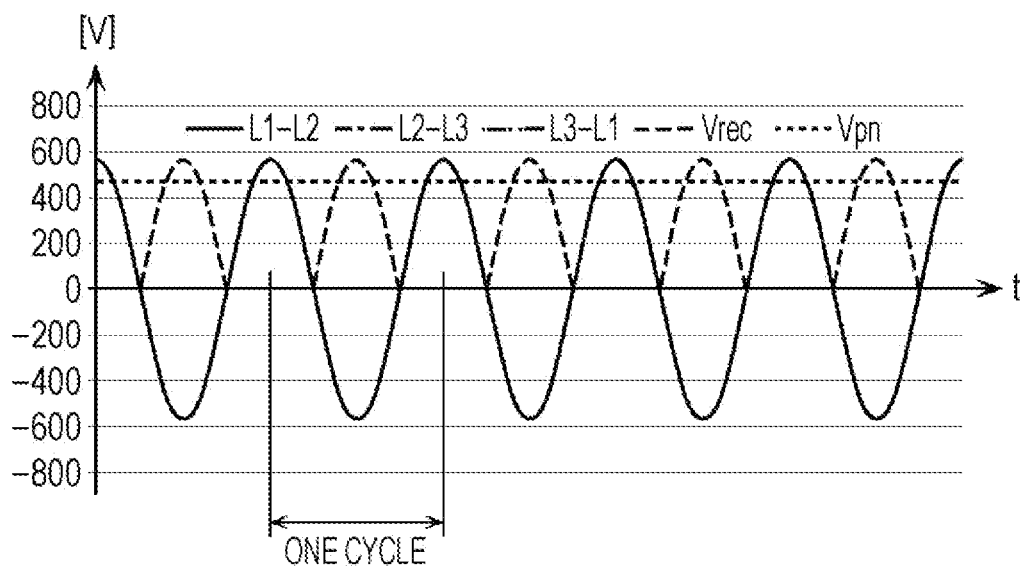
FIG. 2D is a waveform diagram illustrating a voltage waveform in a high load state in a case where there is a phase loss in the three-phase alternating current.

FIG. 2C is a waveform diagram illustrating a voltage waveform in a low load state in a case where there is a phase loss in the three-phase alternating current. FIG. 2D is a waveform diagram illustrating a voltage waveform in a high load state in a case where there is a phase loss in the three-phase alternating current.

In FIGS. 2A, 2B, 2C, and 2), a vertical axis represents a voltage, and a horizontal axis represents a time. L1-L2, L2-L3, and L3-L1 are a voltage difference between the L1 phase and the L2 phase, a voltage difference between the L2 phase and the L3 phase, and a voltage difference between the L3 phase and the L1 phase, respectively. Vrec is a voltage of the unsmoothed direct current rectified by rectifier circuit 11. Vpn is a voltage of the smoothed direct current smoothed by smoothing circuit 15.

Referring back to FIG. 1, the description of motor drive device 10 will be continued.

Current detection circuit 12 detects a current of the unsmoothed direct current rectified by rectifier circuit 11.

Cross point detection circuit 13 detects a cross point between the current detected by current detection circuit 12 and a predetermined current value (here, the predetermined current value is set to 0 [A].). The cross point refers to a state where the current detected by current detection circuit 12 and the predetermined current value have the same value. Here, cross point detection circuit 13 detects the cross point by detecting a change point at which the current detected by current detection circuit 12 changes from a state of the predetermined current value or less to a state of the predetermined current value or more.

Further, cross point detection circuit 13 outputs a drive signal indicating whether or not to drive motor 30 based on a detection result of the cross point. More specifically, cross point detection circuit 13 outputs (1) a control signal indicating that the motor 30 is not to be driven in a case where the number of times of detection of the cross point detected in one cycle of the three-phase alternating current input to rectifier circuit 11 is 2, and outputs (2) a control signal indicating that the motor 30 is to be driven in a case where the number of times of detection of the cross point detected in one cycle of the three-phase alternating current input to rectifier circuit 11 is 0 or 6. The reason why cross point detection circuit 13 outputs the drive signal in this manner is that the number of times of detection of the cross point detected in one cycle of the three-phase alternating current input to rectifier circuit 11, which is detected by cross point detection circuit 13, is 2 in a case where there is a phase loss in the three-phase alternating current input to rectifier circuit 11, and the number of times of detection of the cross point detected in one cycle of the three-phase alternating current input to rectifier circuit 11, which is detected by cross point detection circuit 13, in a case where there is no phase loss in the three-phase alternating current input to rectifier circuit 11, is 0 or 6. That is, cross point detection circuit 13 outputs a control signal indicating that the motor 30 is not to be driven to rectifier circuit 11 in a case where there is a phase loss in the three-phase alternating current input, and outputs a control signal indicating that the motor 30 is to be driven to rectifier circuit 11 in a case where there is no phase loss in the three-phase alternating current input.

Hereinafter, the reason why the number of times of detection of the cross point detected in one cycle of the three-phase alternating current input to rectifier circuit 11, which is detected by cross point detection circuit 13, is 2 in a case where there is a phase loss in the three-phase alternating current input to rectifier circuit 11, and the number of times of detection of the cross point detected in one cycle of the three-phase alternating current input to rectifier circuit 11, which is detected by cross point detection circuit 13 is 0 or 6 in a case where there is no phase loss in the three-phase alternating current input to rectifier circuit 11 will be described with reference to the drawings.

Figure 3A:
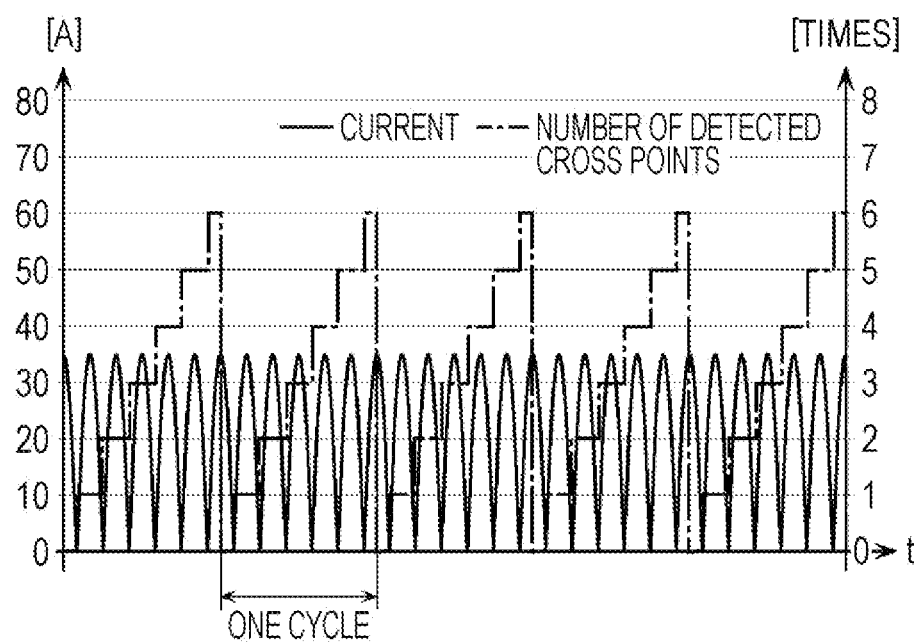
FIG. 3A is a waveform diagram illustrating a current waveform and the number of times of detection of a cross point in a low load state in a case where there is no phase loss in the three-phase alternating current.
Figure 3B:
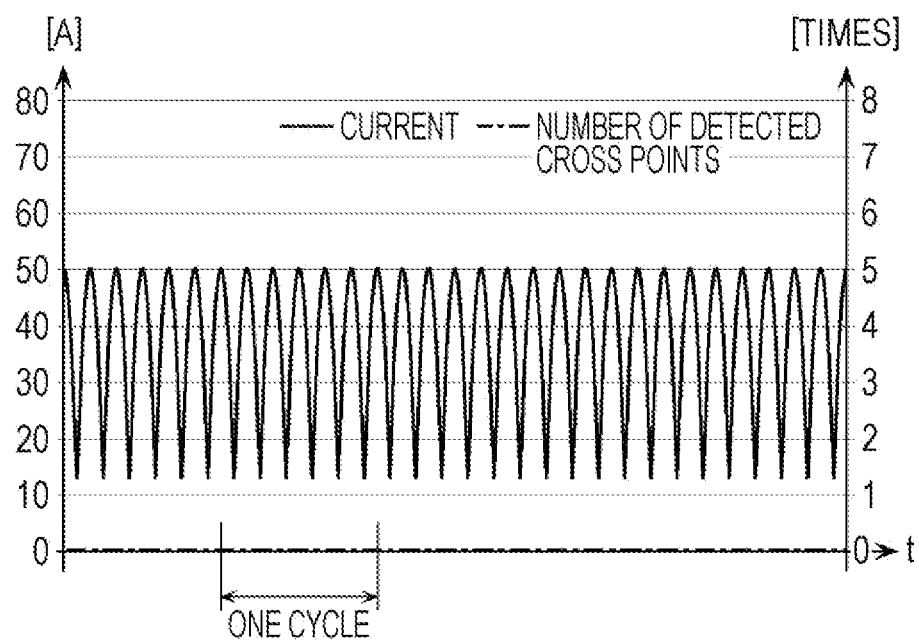
FIG. 3B is a waveform diagram illustrating a current waveform and the number of times of detection of a cross point in a high load state in a case where there is no phase loss in the three-phase alternating current.

FIG. 3A is a waveform diagram illustrating a current waveform and the number of times of detection of a cross point in a low load state in a case where there is no phase loss in the three-phase alternating current. FIG. 3B is a waveform diagram illustrating a current waveform and the number of times of detection of a cross point in a high load state in a case where there is no phase loss in the three-phase alternating current.

Figure 3C:
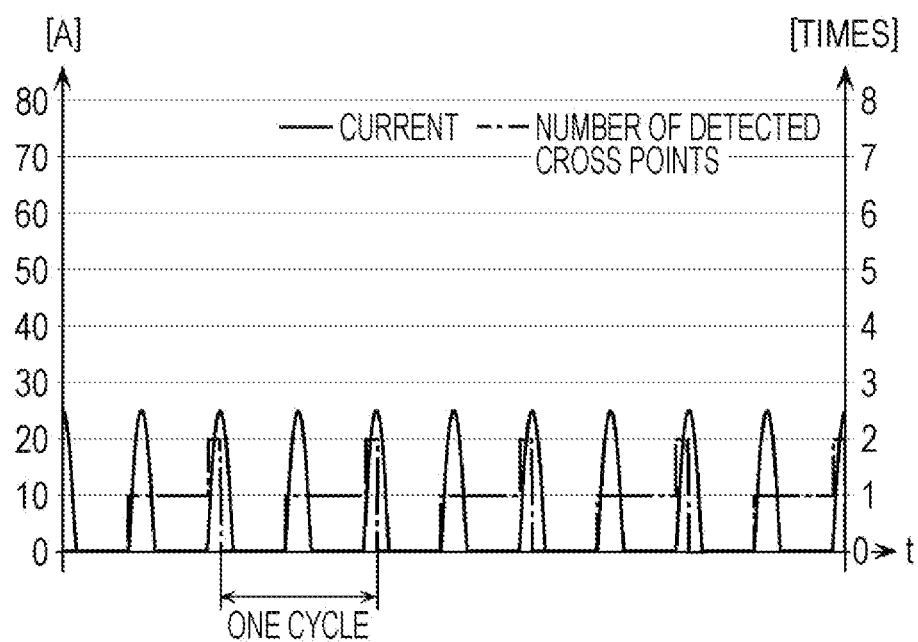
FIG. 3C is a waveform diagram illustrating a current waveform and the number of times of detection of a cross point in a low load state in a case where there is a phase loss in the three-phase alternating current.
Figure 3D:
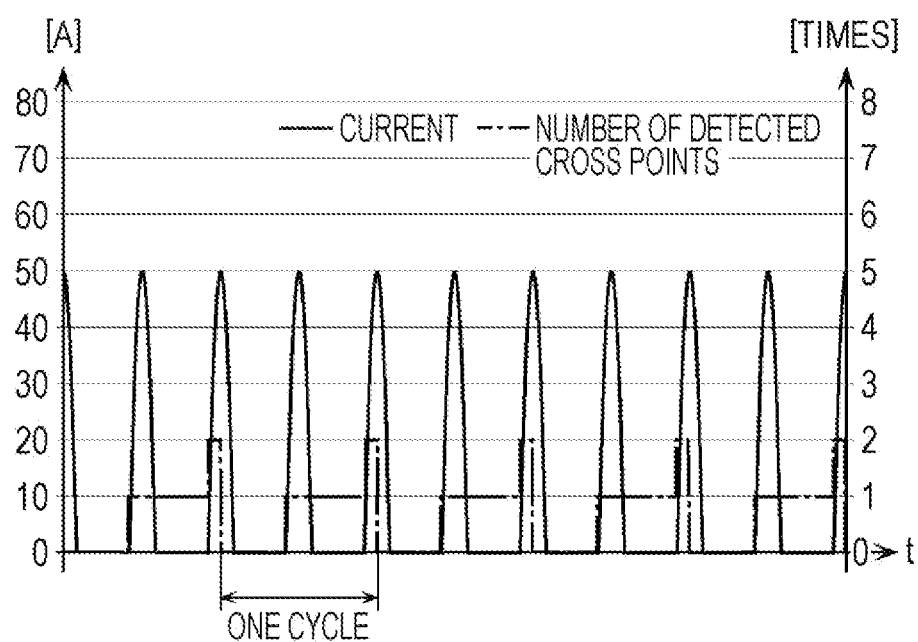
FIG. 3D is a waveform diagram illustrating a current waveform and the number of times of detection of a cross point in a high load state in a case where there is a phase loss in a three-phase alternating current.

FIG. 3C is a waveform diagram illustrating a current waveform and the number of times of detection of a cross point in a low load state in a case where there is a phase loss in the three-phase alternating current. FIG. 3D is a waveform diagram illustrating a current waveform and the number of times of detection of a cross point in a high load state in a case where there is a phase loss in the three-phase alternating current.

As illustrated in FIG. 2A, in a case where the load of motor 30 is in a low load state, when there is no phase loss in the three-phase alternating current input to rectifier circuit 11, the voltage drop occurs only until the voltage of the smoothed direct current is greater than or equal to the minimum voltage of the unsmoothed direct current. Thus, the current flowing from rectifier circuit 11 to smoothing circuit 15, that is, the current detected by current detection circuit 12 constantly has a current value of 0 [A] 6 times in one cycle of the three-phase alternating current input to rectifier circuit 11 as illustrated in FIG. 3A. Thus, as illustrated in FIG. 3A, cross point detection circuit 13 detects the cross point six times in one cycle of the three-phase alternating current input to rectifier circuit 11.

As illustrated in FIG. 2B, in a case where the load of motor 30 is in a high load state, when there is no phase loss in the three-phase alternating current input to rectifier circuit 11, the voltage drop occurs until the voltage of the smoothed direct current is less than the minimum voltage of the unsmoothed direct current. Thus, the current value of the current flowing from rectifier circuit 11 to smoothing circuit 15, that is, the current detected by current detection circuit 12 does not become 0 [A] in one cycle of the three-phase alternating current input to rectifier circuit 11 as illustrated in FIG. 3B. Thus, as illustrated in FIG. 3B, cross point detection circuit 13 detects the cross point 0 times in one cycle of the three-phase alternating current input to rectifier circuit 11.

As described above, in a case where there is no phase loss in the three-phase alternating current input to rectifier circuit 11, cross point detection circuit 13 constantly detects the cross point 0 times or 6 times in one cycle of the three-phase alternating current input to rectifier circuit 11.

As illustrated in FIGS. 2C and 2D, in both a case where the load of motor 30 is in a low load state and a case where the load of motor 30 is in a high load state, when there is a phase loss in the three-phase alternating current input to rectifier circuit 11, the voltage of the smoothed direct current decreases to 0 [V]. Thus, the current flowing from rectifier circuit 11 to smoothing circuit 15, that is, the current detected by current detection circuit 12 constantly has a current value of 0 [A] twice in one cycle of the three-phase alternating current input to rectifier circuit 11 as illustrated in FIGS. 3C and 3D. Thus, as illustrated in FIGS. 3C and 3D, cross point detection circuit 13 constantly detects the cross point twice in one cycle of the three-phase alternating current input to rectifier circuit 11.

Hereinafter, motor stop processing performed by motor drive system 1 having the above configuration will be described.

The motor stop processing is processing of stopping the drive of motor 30 when the phase loss occurs in the three-phase alternating current supplied from three-phase alternating current power supply 20 in a case where motor drive device 10 drives motor 30.

Motor drive device 10 starts driving motor 30, and thus, the motor stop processing is started, for example.

Figure 4:
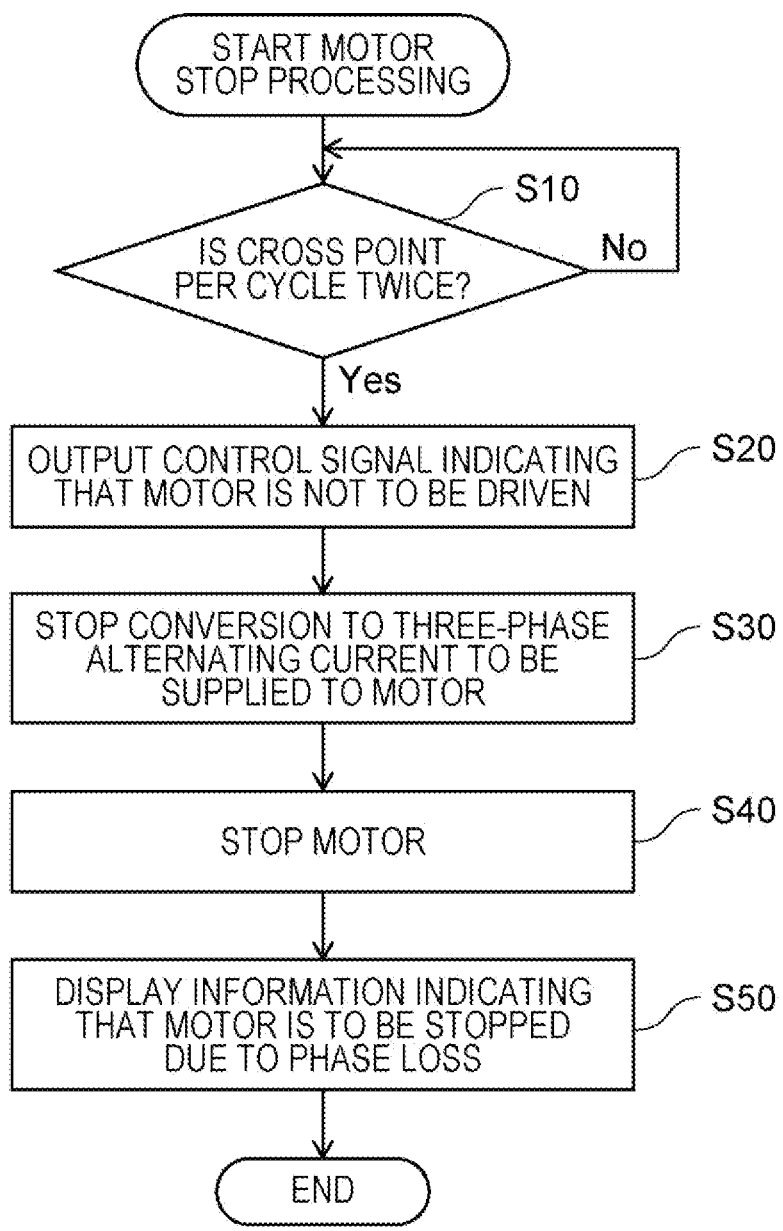
FIG. 4 is a flowchart illustrating motor stop processing.

FIG. 4 is a flowchart illustrating the motor stop processing.

When the motor stop processing is started, cross point detection circuit 13 checks whether the number of times of detection of the cross point detected in one cycle of the three-phase alternating current input to rectifier circuit 11 is 2 (step S10).

In the processing of step S10, in a case where the number of times of detection of the cross point is not 2 (No in step S10), cross point detection circuit 13 returns to the processing of step S10 again and repeats the processing of step S10.

In the processing of step S10, in a case where the number of times of detection of the cross point to be detected is 2 (Yes in step S10), cross point detection circuit 13 outputs a control signal not to drive motor 30 (step S20).

When the control signal indicating that the motor 30 is not to be driven is output, inverter 14 stops the conversion of the smoothed direct current into the three-phase alternating current supplied to motor 30 (step S30).

When the conversion into the three-phase alternating current supplied to motor 30 is stopped, motor 30 is stopped (step S40).

When the control signal indicating that the motor 30 is not to be driven motor 30 is output, since there is a phase loss in the three-phase alternating current input to rectifier circuit 11, the display device 40 displays that motor 30 is stopped (step S50).

When the processing of step S50 is ended, motor drive system 1 ends the motor stop processing.

<Consideration>

As described above, in a case where there is a phase loss in the three-phase alternating current input to rectifier circuit 11, motor drive device 10 outputs the control signal indicating that the motor 30 is not to be driven. As described above, according to motor drive device 10 having the above configuration, in a case where there is a possibility that motor 30 cannot be normally driven due to a phase loss in the three-phase alternating current serving as the power source, the control signal indicating that the motor 30 is not to be driven can be output.

Second Exemplary Embodiment

Hereinafter, a motor drive device according to a second exemplary embodiment configured such that a part of motor drive device 10 according to the first exemplary embodiment is changed will be described.

Figure 5:
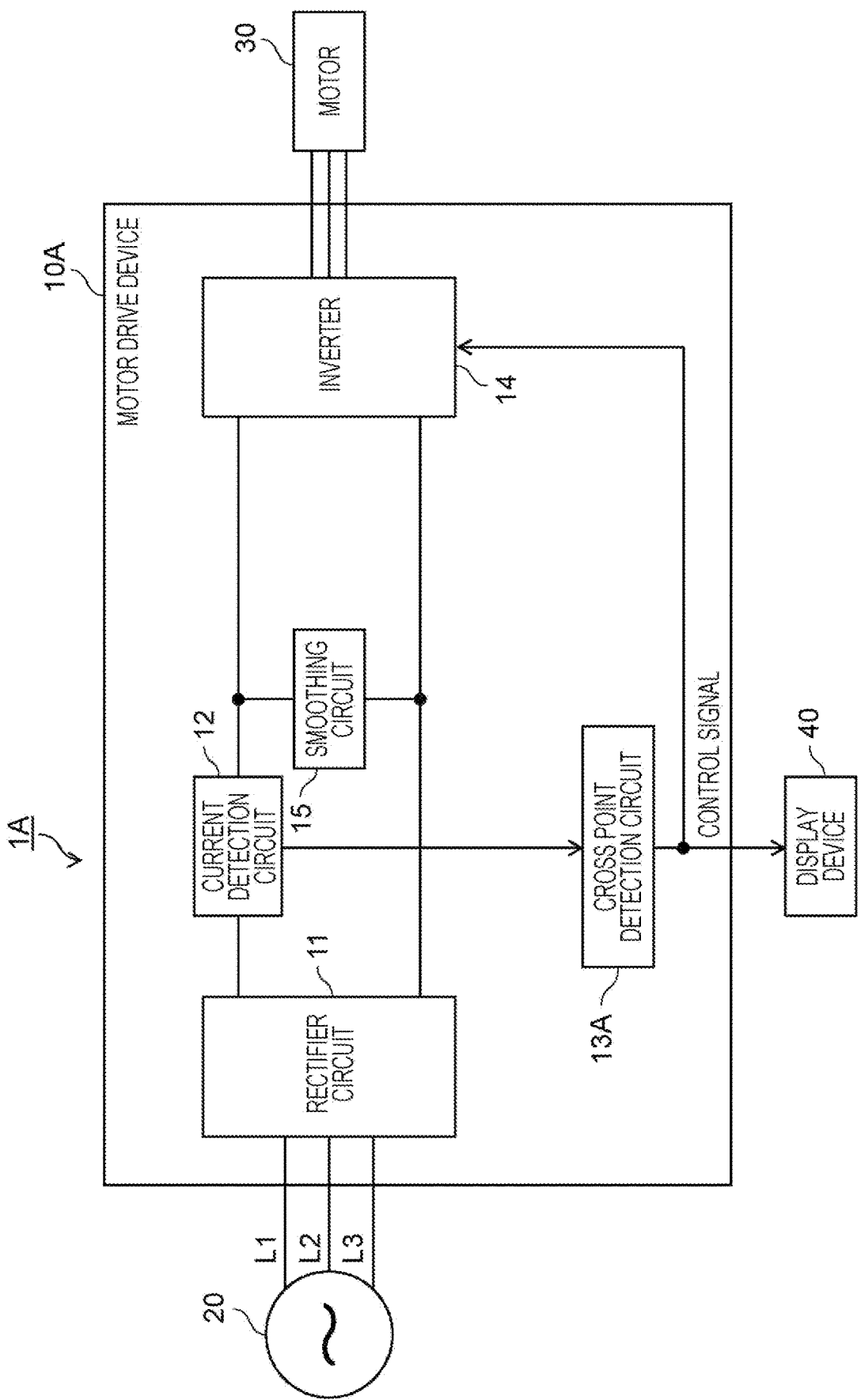
FIG. 5 is a block diagram illustrating a configuration of a motor drive system according to a second exemplary embodiment.

Hereinafter, in the motor drive device according to the second exemplary embodiment, components similar to the components of motor drive device 10 will be denoted by the same reference marks as those already described, detailed description thereof will be omitted, and differences from motor drive device 10 will be mainly described, FIG. 5 is a block diagram illustrating a configuration of motor drive system 1A according to the second exemplary embodiment.

As illustrated in FIG. 5, motor drive system 1A is configured such that motor drive device 10 of motor drive system 1 according to the first exemplary embodiment is changed to motor drive device 10A. Motor drive device 10A is configured such that cross point detection circuit 13 of motor drive device 10 is changed to cross point detection circuit 13A.

Cross point detection circuit 13 according to the first exemplary embodiment has a configuration in which a predetermined current value is set to 0 [A]. On the other hand, cross point detection circuit 13A has a configuration in which a predetermined current value is set to a positive value X [A]. Here, predetermined current value X [A] which is a positive value is a maximum value of the current flowing from rectifier circuit 11 to smoothing circuit 15 in a case where a load with which motor 30 can be normally driven is applied to motor 30 even though there is a phase loss in the three-phase alternating current input to rectifier circuit 11. As a result, according to cross point detection circuit 13A having the above configuration, even in a case where there is a phase loss in the three-phase alternating current input to rectifier circuit 11, when a load with which motor 30 can be normally driven is applied to motor 30, the number of times of detection of the cross point detected in one cycle of the three-phase alternating current input to rectifier circuit 11 is 0.

On the other hand, according to cross point detection circuit 13A having the above configuration, in a case where there is a phase loss in the three-phase alternating current input to rectifier circuit 11, when a load greater than or equal to a load with which motor 30 can be normally driven is applied to motor 30, similarly to cross point detection circuit 13 according to the first exemplary embodiment, the number of times of detection of the cross point to be detected in one cycle of the three-phase alternating current input to rectifier circuit 11 is 2. According to cross point detection circuit 13A having the above configuration, in a case where there is no phase loss in the three-phase alternating current input to rectifier circuit 11, similarly to cross point detection circuit 13 according to the first exemplary embodiment, the number of times of detection of the cross point detected in one cycle of the three-phase alternating current input to rectifier circuit 11 is 0 or 6.

Therefore, in a case where there is no phase loss in the three-phase alternating current input to rectifier circuit 11 and there is a phase loss in the three-phase alternating current input to rectifier circuit 11, cross point detection circuit 13A outputs a control signal to drive motor 30 when the load applied to motor 30 is a load with which motor 30 can be normally driven, and outputs a control signal not to drive motor 30 when there is a phase loss in the three-phase alternating current input to rectifier circuit 11 and the load applied to motor 30 is a load greater than or equal to the load with which motor 30 can be normally driven.

<Consideration>

In addition to a case where there is no phase loss in the three-phase alternating current input to rectifier circuit 11, even in a case where there is a phase loss in the three-phase alternating current input to rectifier circuit 11, motor drive device 10A having the above configuration outputs a control signal indicating that the motor 30 is to be driven when the load applied to motor 30 is small enough to normally drive motor 30. On the other hand, in a case where there is a phase loss in the three-phase alternating current input to rectifier circuit 11, when the load applied to motor 30 is a load greater than or equal to a load with which drive motor 30 can be normally driven, motor drive device 10A outputs a control signal indicating that the motor 30 is not to be driven. As described above, according to motor drive device 10A having the above configuration, in a case where there is a possibility that motor 30 cannot be normally driven due to a phase loss in the three-phase alternating current serving as the power source, it is possible to output the control signal indicating that the motor 30 is not to be driven.

Third Exemplary Embodiment

Hereinafter, a motor drive device according to a third exemplary embodiment configured such that a part of motor drive device 10 according to the first exemplary embodiment is changed will be described.

Hereinafter, in the motor drive device according to the third exemplary embodiment, components similar to the components of motor drive device 10 will be denoted by the same reference marks as those already described, detailed description thereof will be omitted, and differences from motor drive device 10 will be mainly described.

Figure 6:
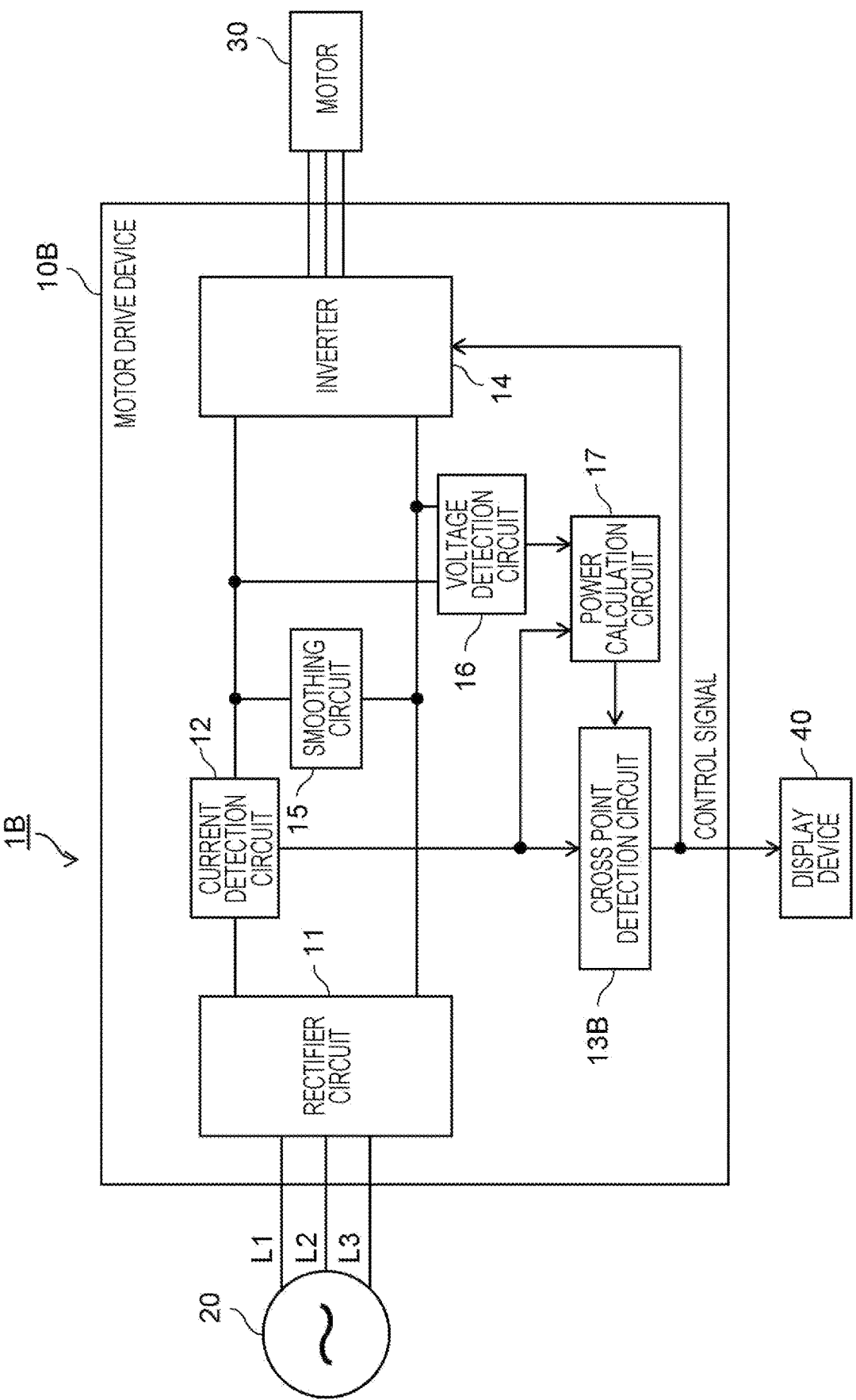
FIG. 6 is a block diagram illustrating a configuration of a motor drive system according to a third exemplary embodiment.

FIG. 6 is a block diagram illustrating a configuration of motor drive system 1B according to the third exemplary embodiment.

As illustrated in FIG. 6, motor drive system 1B is configured such that motor drive device 10 of motor drive device 10 according to the first exemplary embodiment is changed to motor drive device 10B. As illustrated in FIG. 6, motor drive device 10 is configured such that voltage detection circuit 16 and power calculation circuit 17 are added to motor drive device 10 and cross point detection circuit 13 is changed to cross point detection circuit 13B.

Voltage detection circuit 16 detects the voltage of the smoothed direct current smoothed by smoothing circuit 15.

Power calculation circuit 17 calculates a power for driving motor 30 based on the current detected by current detection circuit 12 and the voltage detected by voltage detection circuit 16.

In a case where the calculated power is smaller than a predetermined power value, power calculation circuit 17 outputs a first signal indicating that the calculated power is smaller than the predetermined power value. Here, even though there is a phase loss in the three-phase alternating current input to rectifier circuit 11, the predetermined power value is a maximum value of the power for driving motor 30 in a case where the load applied to motor 30 is a load with which motor 30 can be normally driven.

Similarly to cross point detection circuit 13 according to the first exemplary embodiment, cross point detection circuit 13B detects a cross point between the current detected by current detection circuit 12 and a predetermined current value (here, the predetermined current value is set to 0 [A].).

Cross point detection circuit 13D outputs a drive signal indicating whether or not to drive motor 30 based on a detection result of the cross point. More specifically, cross point detection circuit 13D outputs (1) a control signal indicating that the motor 30 is not to be driven when the first signal is not output from power calculation circuit 17 in a case where the number of times of detection of the cross point detected in one cycle of the three-phase alternating current input to rectifier circuit 11 is 2, and outputs (2) a control signal indicating that the motor 30 is to be driven when the first signal is output from power calculation circuit 17 in a case where the number of times of detection of the cross point detected in one cycle of the three-phase alternating current input to rectifier circuit 11 is 0 or 6 and in a case where the number of times of detection of the cross point detected in one cycle of the three-phase alternating current input to rectifier circuit 11 is 2. That is, cross point detection circuit 13B outputs a control signal indicating that the motor 30 is not to be driven when the load applied to motor 30 is a load greater than or equal to a load with which motor 30 can be normally driven in a case where there is a phase loss in the three-phase alternating current input to rectifier circuit 11, and outputs a control signal indicating that the motor 30 is to be driven when the load applied to motor 30 is a load with which motor 30 can be normally driven in a case where there is no phase loss in the three-phase alternating current input to rectifier circuit 11 and in a case where there is a phase loss in the three-phase alternating current input to rectifier circuit 11.

<Consideration>

In addition to a case where there is no phase loss in the three-phase alternating current input to rectifier circuit 11, even in a case where there is a phase loss in the three-phase alternating current input to rectifier circuit 11, when the load applied to motor 30 is small enough to normally drive motor 30, motor drive device 10B having the above configuration suppresses the output of the control signal indicating that the motor 30 is not to be driven and instead outputs the control signal indicating that the motor 30 is to be driven. On the other hand, when there is a phase loss in the three-phase alternating current input to rectifier circuit 11 and the load applied to motor 30 is a load greater than or equal to a load with which motor 30 can be normally driven, motor drive device 10B outputs a control signal indicating that the motor 30 is not to be driven. As described above, according to motor drive device 10B having the above configuration, in a case where there is a possibility that motor 30 cannot be normally driven due to a phase loss in the three-phase alternating current serving as the power source, it is possible to output the control signal indicating that the motor 30 is not to be driven.

Supplementary

The motor drive device according to one aspect of the present disclosure has been described above based on the first to third exemplary embodiments. However, the present disclosure is not limited to these exemplary embodiments. Configurations in which various modifications conceived by those skilled in the art are applied to these exemplary embodiments, and configurations established by combining structural elements in different exemplary embodiments may also fall within the scope of one or more aspects, without departing from the scope of the present disclosure.

(1) In the first to third exemplary embodiments, cross point detection circuit 13, cross point detection circuit 13A, and cross point detection circuit 13B may count the number of times of detection of the cross point detected in one cycle of the three-phase alternating current input to rectifier circuit 11 every one cycle, or may count an average value of a plurality of cycles.

(2) In the second exemplary embodiment, predetermined current value X [A] set in cross point detection circuit 13A is the maximum value of the current flowing from rectifier circuit 11 to smoothing circuit 15 in a case where the load applied to motor 30 is a load with which motor 30 can be normally driven even though there is a phase loss in the three-phase alternating current input to rectifier circuit 11. On the other hand, as another configuration, a positive value smaller than the maximum value may be used. In the case of this configuration, in a case where there is a phase loss in the three-phase alternating current input to rectifier circuit 11, when a control signal indicating that the motor 30 is to be driven is output from cross point detection circuit 13A, the load applied to motor 30 is a load with which motor 30 can be normally driven.

(3) In the third exemplary embodiment, the predetermined power value set in power calculation circuit 17 is the maximum value of the power for driving motor 30 in a case where the load applied to motor 30 is a load with which motor 30 can be normally driven even though there is a phase loss in the three-phase alternating current input to rectifier circuit 11. On the other hand, as another configuration, a value smaller than the maximum value may be used. In the case of this configuration, in a case where there is a phase loss in the three-phase alternating current input to rectifier circuit 11, when a control signal indicating that the motor 30 is to be driven is output from cross point detection circuit 13B, the load applied to motor 30 is a load with which motor 30 can be normally driven.

(4) In the third exemplary embodiment, voltage detection circuit 16 is configured to detect the voltage of the smoothed direct current smoothed by smoothing circuit 15. On the other hand, as another configuration, voltage detection circuit 16 may be configured to detect the voltage of the unsmoothed direct current before being smoothed by smoothing circuit 15.

(5) An example of the motor drive device according to one aspect of the present disclosure will be further described below.

(a) A motor drive device according to one aspect of the present disclosure is a motor drive device that drives a motor using a three-phase alternating current as a power source. The motor drive device includes a rectifier circuit that rectifies the three-phase alternating current to generate a direct current, a current detection circuit that detects the direct current rectified by the rectifier circuit, and a cross point detection circuit that detects a cross point between the direct current detected by the current detection circuit and a predetermined current value, and outputs a control signal indicating whether or not to drive the motor based on a result of the detection.

According to the motor drive device having the above configuration, the predetermined current value is set to an appropriate value, and thus, a detection frequency of the cross point can be set to be different between a case where there is a possibility that the motor cannot be norm ally driven due to a phase loss in the three-phase alternating current serving as the power source and a case where there is no possibility that the motor cannot be normally driven. Thus, according to the motor drive device having the above configuration, in a case where there is a possibility that the motor cannot be normally driven due to a phase loss in the three-phase alternating current serving as the power source, it is possible to output the control signal indicating that the motor is not to be driven.

(b) The cross point detection circuit may output the control signal indicating that the motor is not to be drive the motor in a case where the number of times of detection of the cross point detected in one cycle of the three-phase alternating current is 2.

As a result, when there is a phase loss in the three-phase alternating current, a control signal indicating that the motor is not to be driven can be output.

(c) The predetermined current value may be zero, and the cross point detection circuit may further output a control signal indicating that the motor 30 is to be driven in a case where the number of times of the cross point detected in one cycle of the three-phase alternating current is 0 or 6.

As a result, in a case where there is no phase loss in the three-phase alternating current, a control signal to drive the motor can be output.

(d) The predetermined current value may be a positive value, and the cross point detection circuit may further output a control signal indicating that the motor 30 is to be driven in a case where the number of times of the detection of the cross point in one cycle of the three-phase alternating current is 0.

As a result, the predetermined current value is set to an appropriate value, and thus, it is possible to output a control signal indicating that the motor is to be driven when the load applied to the motor is small enough to normally drive the motor even in a case where there is a phase loss in the three-phase alternating current.

(e) The motor control device may further include a power calculation circuit that calculates a power for driving the motor, and in a case where the power calculated by the power calculation circuit is smaller than a predetermined power value, the cross point detection circuit may suppress the output of the control signal indicating that the motor is not to be driven.

As a result, the predetermined power value is set to an appropriate value, and thus, it is possible to suppress the output of the control signal indicating that the motor 30 is not to be driven when the load applied to the motor is small enough to normally drive the motor even though there is a phase loss in the three-phase alternating current.

(1) The motor control device may further include a smoothing circuit that smooths a direct current generated by the rectifier circuit, and an inverter to which the direct current smoothed by the smoothing circuit is supplied to drive the motor. The current detection circuit may detect the current value by using the direct current generated by the rectifier circuit before being smoothed by the smoothing circuit.

As a result, the direct current supplied to the inverter can be a smoothed direct current.

INDUSTRIAL APPLICABILITY

The present disclosure is widely applicable to a motor drive device that drives a motor.

REFERENCE MARKS IN THE DRAWINGS 1, 1A, 1B: motor drive system
10, 10A, 10B: motor drive device
11: rectifier circuit
12: current detection circuit
13, 13A, 13B: cross point detection circuit
14: inverter
15: smoothing circuit
16: voltage detection circuit
17: power calculation circuit
20: three-phase alternating current power supply
30: motor
40: display device

The invention claimed is:

1. A motor drive device that drives a motor using a three-phase alternating current as a power source, the motor drive device comprising:
   a rectifier circuit that rectifies the three-phase alternating current to generate a rectified current;
   a current detection circuit that detects the rectified current rectified by the rectifier circuit;
   a cross point detection circuit that detects a cross point between the rectified current detected by the current detection circuit and a predetermined current value, counts a number of times of the detection of the cross point in one cycle of the three-phase alternating current, and outputs a control signal indicating whether or not to drive the motor based on the number of times of the detection of the cross point in one cycle of the three-phase alternating current; and
   a power calculation circuit that calculates a power for driving the motor, wherein:
   the cross point detection circuit outputs the control signal indicating that the motor is not to be driven in a case where the number of times of the detection of the cross point in one cycle of the three-phase alternating current is 2, and
   the cross point detection circuit suppresses an output of the control signal indicating that the motor is not to be driven, in a case where a power calculated by the power calculation circuit is smaller than a predetermined power value.

2. The motor drive device according to claim 1, wherein:
   the predetermined current value is zero, and
   the cross point detection circuit further outputs the control signal indicating that the motor is to be driven, in a case where the number of times of the detection of the cross point in one cycle of the three-phase alternating current is 0 or 6.

3. The motor drive device according to claim 1, wherein:
   the predetermined current value is a positive value, and
   the cross point detection circuit further outputs the control signal indicating that the motor is to be driven, in a case where the number of times of the detection of the cross point in one cycle of the three-phase alternating current is 0.

4. The motor drive device according to claim 1, further comprising:
   a smoothing circuit that smooths the rectified current generated by the rectifier circuit to obtain a direct current; and
   an inverter to which the direct current obtained by the smoothing circuit is supplied to drive the motor,
   wherein the current detection circuit detects a current value by using the rectified current generated by the rectifier circuit before being smoothed by the smoothing circuit.

* * * * *